(12) United States Patent
Jeong

(10) Patent No.: US 7,117,564 B2
(45) Date of Patent: Oct. 10, 2006

(54) HINGE DEVICE FOR MOBILE PHONE HAVING ROTATION TYPE DISPLAY

(75) Inventor: Jong-Gab Jeong, Yongin-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/979,316

(22) Filed: Nov. 2, 2004

(65) Prior Publication Data

US 2005/0124392 A1 Jun. 9, 2005

(30) Foreign Application Priority Data

Nov. 6, 2003 (KR) ........................ 10-2003-0078275

(51) Int. Cl.
*E05D 11/10* (2006.01)
(52) U.S. Cl. .................... 16/334; 16/273; 16/362
(58) Field of Classification Search ................ 16/334, 16/303, 330, 273, 362, 364, 366, 367, 337, 16/338, 339, 340; 455/575.1, 575.3, 575.4; 379/433.13, 434; 361/683, 803
See application file for complete search history.

(56) References Cited

U.S. PATENT DOCUMENTS

2003/0013417 A1* 1/2003 Bum ........................ 455/90
2004/0113038 A1* 6/2004 Schuurmans et al. ....... 248/479
2004/0121826 A1* 6/2004 Ma et al. ................. 455/575.4
2004/0203527 A1* 10/2004 Matsumoto ................ 455/90.3
2005/0091796 A1* 5/2005 Lu et al. ....................... 16/337

FOREIGN PATENT DOCUMENTS

| EP | 1 324 572 | 7/2003 |
| EP | 1 357 726 | 10/2003 |
| JP | 2001-156893 | 6/2001 |
| JP | 2001156893 A * | 6/2001 |

* cited by examiner

*Primary Examiner*—JJ Swann
*Assistant Examiner*—Mark Vogelbacker
(74) *Attorney, Agent, or Firm*—Dilworth & Barrese LLP

(57) ABSTRACT

Disclosed is a hinge device for a mobile phone having a rotation type display including a body housing, a folder having a display unit, and a connection member for rotatably connecting the folder to the body housing such that the folder is rotatably moved into an open position or a closed position with respect to the body housing. The hinge device includes a hinge module having a plate shape. The hinge module is accommodated in the folder and rotatably coupled to the connection member while facing the connection member so as to rotate the folder relative to the connection member about a hinge axis thereof.

12 Claims, 14 Drawing Sheets

HINGE DEVICE FOR MOBILE PHONE HAVING ROTATION TYPE DISPLAY

PRIORITY

This application claims priority to an application entitled "Hinge Device For Display Rotation Type Mobile Phone" filed with the Korean Intellectual Property Office on Nov. 6, 2003 and assigned Ser. No. 2003-78275, the contents of which are incorporated herein by reference.

BACKGROUND OF THE INVENTION

1. Field of the Invention

The present invention relates to a mobile phone having a rotation type display, and more particularly to a hinge device for a mobile phone including a plate-type hinge module for rotatably supporting a folder having a rotatable display unit.

2. Description of the Related Art

In general, a "portable communication apparatus" refers to an electronic appliance allowing users to make wireless communication with other users while carrying the portable communication apparatus. Such portable communication apparatuses are classified into various types according to their appearance. For example, the portable communication apparatuses are classified as either a bar-type portable communication apparatuses, flip-type portable communication apparatuses, or folder-type portable communication apparatuses, according to their appearance. The bar-type portable communication apparatus has a single housing shaped like a bar. The flip-type portable communication apparatus has a flip which is pivotably coupled to a bar-shaped housing by a hinge unit. The folder-type portable communication apparatus has a folder coupled to a single bar-shaped housing by a hinge unit in such a manner that the folder can be rotated in order to be folded towards or unfolded away from the housing.

Further, portable communication apparatuses may be classified into rotation-type communication apparatuses and sliding-type communication apparatuses according to ways of opening and closing the portable communication apparatuses. In the rotation-type portable communication apparatus, two housings are coupled to each other in such a manner that one housing rotates opened or closed relative to the other while they face each other. In the sliding-type portable communication apparatus, two housings are coupled to each other in such a manner that one housing can longitudinally slide along the other housing. These variously classified portable communication apparatuses can be easily understood by those skilled in the art.

Recently, designs of such portable communication apparatuses tend to be compact, slim, and light in consideration of portability. However, the conventional portable communication apparatuses are convenient only when making voice or image communication with other users.

As shown in FIGS. 1 to 3, a conventional display rotation type portable terminal includes a body housing 10 provided at one end thereof with a first hinge axis A1, a folder 20 and a connection member 30. The body housing 10 has various key buttons 11 and a microphone 12. The connection member 30 connects the body housing 10 to the folder 20 and allows the folder 20 to rotatably move into an open position or a closed position with respect to the body housing 10 about the first hinge axis A1. In addition, the connection member 30 is provided with a second hinge axis A2. The folder 20 is rotatably moved with respect to the connection member 30 about the second hinge axis A2. The folder 20 is provided with a display unit, such as an LCD 21, and a speaker 22.

A hinge module 40 is accommodated in the connection member 30 so as to allow the folder 20 to rotate about the second hinge axis A2.

According to the conventional display rotation type portable terminal, the display unit of the folder can be rotated so as to provide users with a wide screen when viewing a moving picture, a video, or playing a game.

However, in the conventional display rotation type portable terminal, the hinge module for rotating the display unit of the folder is exposed to an exterior, so the hinge module may be easily broken when external impact is applied thereto. In addition, since the hinge module has a large size and thickness, not only is it difficult to make a compact-sized portable terminal, but also various limitations may occur when designing the portable terminal.

In addition, according to the hinge module of the conventional rotatable display type portable terminal, the rotational function of the folder may deteriorateover time.

SUMMARY OF THE INVENTION

Accordingly, the present invention has been made to solve the above-mentioned problems occurring in the prior art, and an object of the present invention is to provide a hinge device for a mobile phone having a rotation type display including a plate-type hinge module for rotatably supporting a folder having a display unit, thereby improving convenience of use for the mobile phone.

Another object of the present invention is to provide a hinge device for a mobile phone having a rotation type display, in which a plate-type hinge module is accommodated in a folder, thereby reducing a size and a thickness of the hinge module and implementing a compact-sized mobile phone.

Still another object of the present invention is to provide a hinge device for a mobile phone having a rotation type display, in which a plate-type hinge module is accommodated in a folder, thereby preventing the hinge module from being broken and improving convenience of use for the mobile phone.

In order to accomplish these objects, there is provided a hinge device for a mobile phone having a rotation type display including a body housing, a folder having a display unit, and a connection member for rotatably connecting the folder to the body housing such that the folder is rotatably moved into an open position or a closed position with respect to the body housing, the hinge device including a hinge module having a plate shape, the hinge module being accommodated in the folder and rotatably coupled to the connection member while facing the connection member so as to rotate the folder relative to the connection member about a hinge axis thereof.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
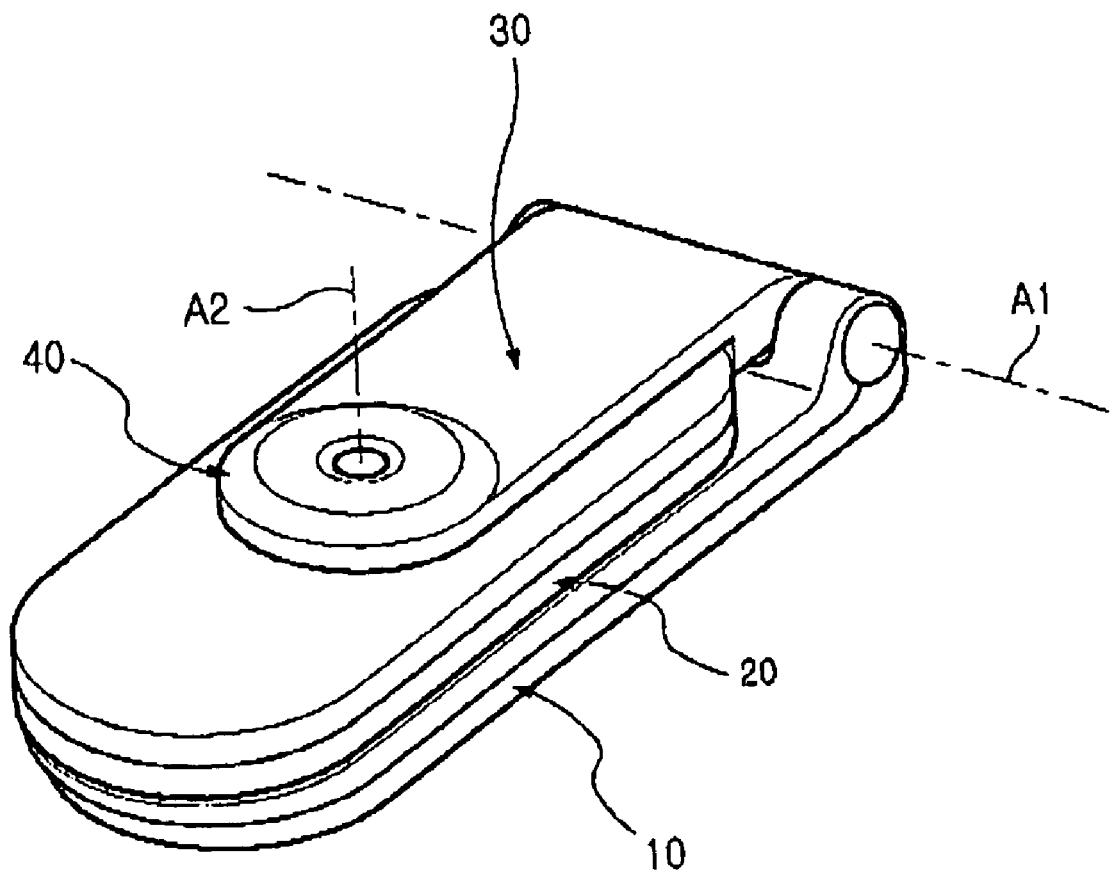
FIG. 1 is a perspective view illustrating a conventional mobile phone having a rotation type display in a closed state.
Figure 2:
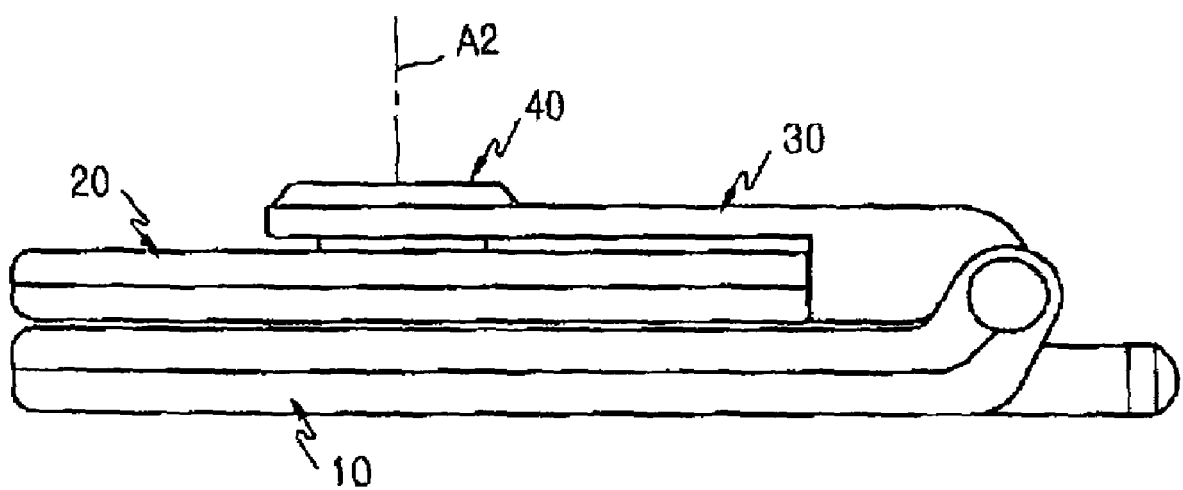
FIG. 2 is a side view of FIG. 1.
Figure 3:
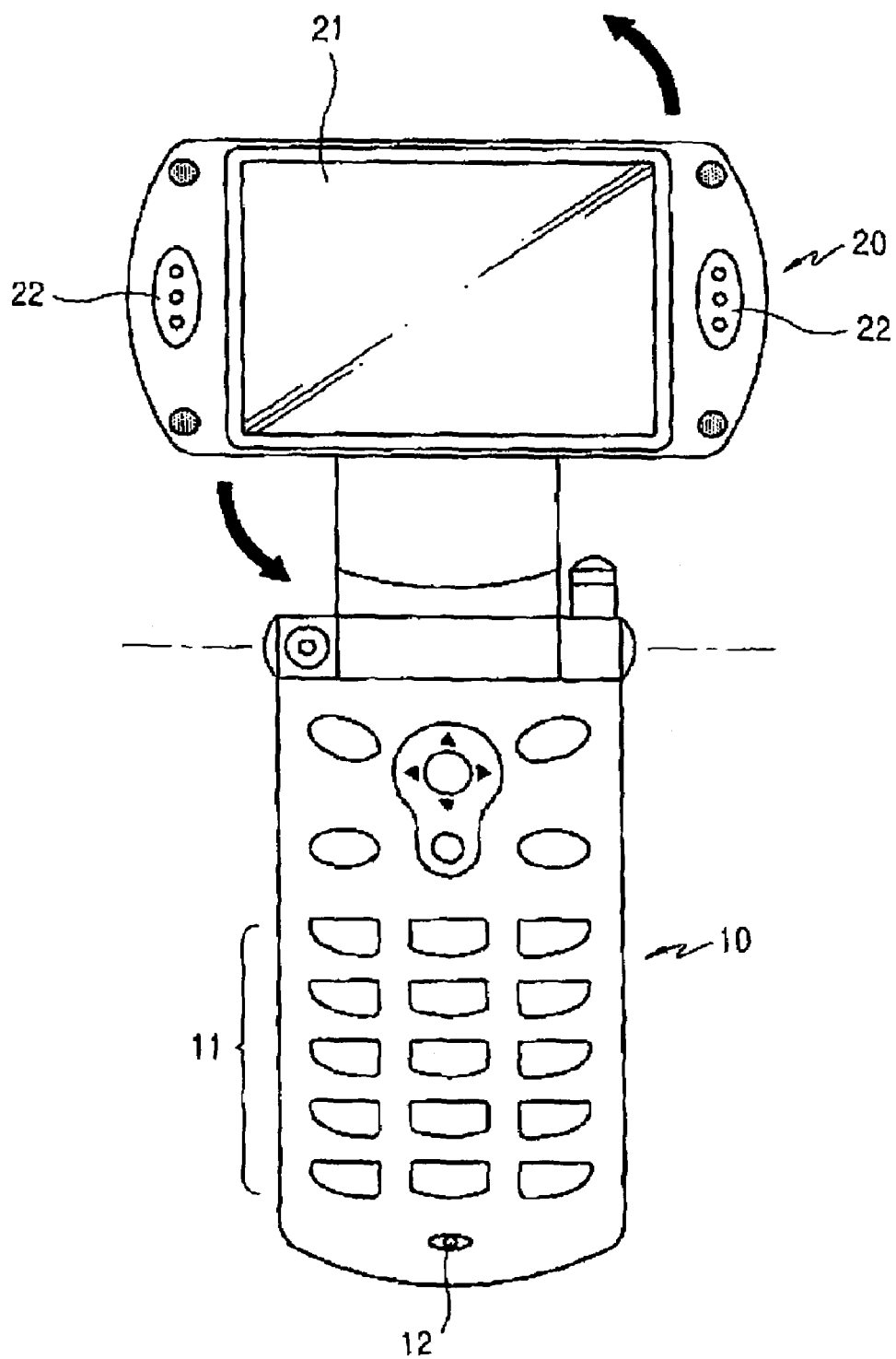
FIG. 3 is a plan view illustrating a conventional mobile phone having a rotation type display in an open state in which a folder is rotated at a right angle.

Hereinafter, preferred embodiments of the present invention will be described with reference to the accompanying drawings. In the following description of the present invention, a detailed description of known functions and configurations incorporated herein will be omitted when it may make the subject matter of the present invention unclear.

As shown in FIGS. 4 to 14, a mobile phone having a rotation type display includes a body housing 10, a folder 20 having a display unit 21, and a connection member 30 for rotatably connecting the folder 20 to the body housing 10 such that the folder 20 is rotatably moved into an open position or a closed position with respect to the body housing 10.

A hinge device of the mobile phone having a rotation type display includes a hinge module 100. The hinge module 100 is rotatably coupled to the connection member 30 while facing the connection member 30. The hinge module 100 is accommodated in the folder 20 in such a manner that the folder 20 can rotate about a hinge axis A2.

The hinge module 100 has a plate shape so that the hinge module 100 can be stably accommodated in the folder 20 and the connection member 30. The hinge module 100 includes first and second hinge plates 200 and 300, a rotary washer 400, a wave washer 500, and a snap ring 600. The first hinge plate 200 is rotatably coupled to the second hinge plate 300 and is screw-coupled with the connection member 30. The second hinge plate 300 is coupled with the first hinge plate 200 and is accommodated in the folder 20 such that the folder 20 can rotate about a hinge axis A2.

The rotary washer 400 is provided between the first and second hinge plates 200 and 300 while facing the first hinge plate 200 so as to rotatably support the second plate 300. The wave washer 500 is provided between the second hinge plate 300 and the rotary washer 400 and applies a biasing force to the folder 20 so as to rotate the folder 20. The snap ring 600 is provided to sequentially couple the first and second hinge plates 200 and 300, the rotary washer 400, and the wave washer 500 to each other. The snap ring 600 is accommodated in a coupling slot 302b of a hinge housing 302 formed in the second hinge plate 300. In addition, the connection member 30 has a first coupling recess 31 in order to receive the first hinge plate 200 therein. The folder 20 is formed with a second coupling recess 23 in order to receive the second hinge plate 300 therein.

The first hinge plate 200 includes a perforated hole 201, a coupling hole 202, at least one washer groove 203, a stopper protrusion 204, and a plurality of screw holes 205. The perforated hole 201 is formed at a center of the first hinge plate 200 in such a manner that the hinge housing 302 of the second hinge plate 300 can pass through the perforated hole 201. In addition, a flexible circuit connected to the folder 20 is connected to the body housing 10 while passing through the perforated hole 201 of the first hinge plate 200. The coupling hole 202 is formed around the perforated hole 201 so as to be coupled with the rotary washer 400.

Washer grooves 203 are formed in a circumferential direction of the coupling hole 202 with a uniform interval so as to stably receive a washer protrusion 401 of the rotary washer 400 therein.

The stopper protrusion 204 is provided at a predetermined outer portion of the washer groove 203 and is inserted into a guide slot 304 formed in the second hinge plate 300 so as to limit the rotation of the folder 20. The screw holes 205 are formed in the first hinge plate 200 so as to allow the first hinge plate 200 to be screw-coupled with the connection member 30.

In addition, the second hinge plate 300 includes a perforated hole 301, the hinge housing 302, a receiving groove 303, the guide slot 304 and a plurality of screw holes 305. The perforated hole 301 is positioned at a center of the second hinge plate 300 and is defined by the second hinge housing 302 in such a manner that the flexible circuit connected to the folder 20 is connected to the body housing 10 while passing through the perforated hole 301 of the second hinge plate 300. The hinge housing 302 is inserted into the perforated hole 201 of the first hinge plate 200 and protrudes from an outer peripheral portion of the perforated hole 301 along the hinge axis A2. Preferably, the hinge housing 302 has a cylindrical shape.

The receiving groove 303 is formed around the hinge housing 302 in order to receive the wave washer 500 therein. The guide slot 304 is formed at an outer portion of the receiving groove 303 and is coupled with the stopper protrusion 204 of the first hinge plate 200 so as to guide the stopper protrusion 204 and to limit the rotation of the folder 20 when the folder 20 rotates. The screw holes 305 are formed in the second hinge plate 300 so as to allow the second hinge plate 300 to be screw-coupled with the folder 20. In addition, the guide slot 304 is formed along a circumference of the receiving groove 303 with a predetermined length such that the folder 20 can rotate at a right angle relative to the connection member 30. The hinge housing 302 is formed with a pair of fixing slots 302a and fixing protrusions 402 of the rotary washer 400 are fixedly inserted into the fixing slots 302a. In addition, the hinge housing 302 is formed at one end thereof with a coupling slot 302b to which the snap ring 600 is coupled after the rotary washer 400 and the wave washer 500 have been sequentially coupled with the perforated holes 201 and 301.

The rotary washer 400 includes at least one washer protrusion 401 and a pair of fixing protrusions 402. The washer protrusions 401 are formed along an outer circumferential portion of the rotary washer with a uniform interval in such a manner that the washer protrusions 401 are inserted into the washer grooves of the first hinge plate 200. The fixing protrusions 402 are formed at an inner portion of the rotary washer 400 and are fixedly inserted into the fixing slots 302a of the hinge housing 302 so as to allow the rotary washer 400 to rotate together with the second hinge plate 300.

In addition, the fixing slots 302a are symmetrically aligned about the hinge housing 302, so the fixing protrusions 402 inserted into the fixing slots 302a are also symmetrically aligned about the hinge housing 302. The wave washer 500 includes a leaf spring having a ring-like shape, a circumference of which is irregularly formed.

Hereinafter, an operation of the hinge device for the mobile phone having a rotation type display having the above construction according to the preferred embodiment of the present invention will be described in detail with reference to FIGS. 4 to 14.

Figure 4:
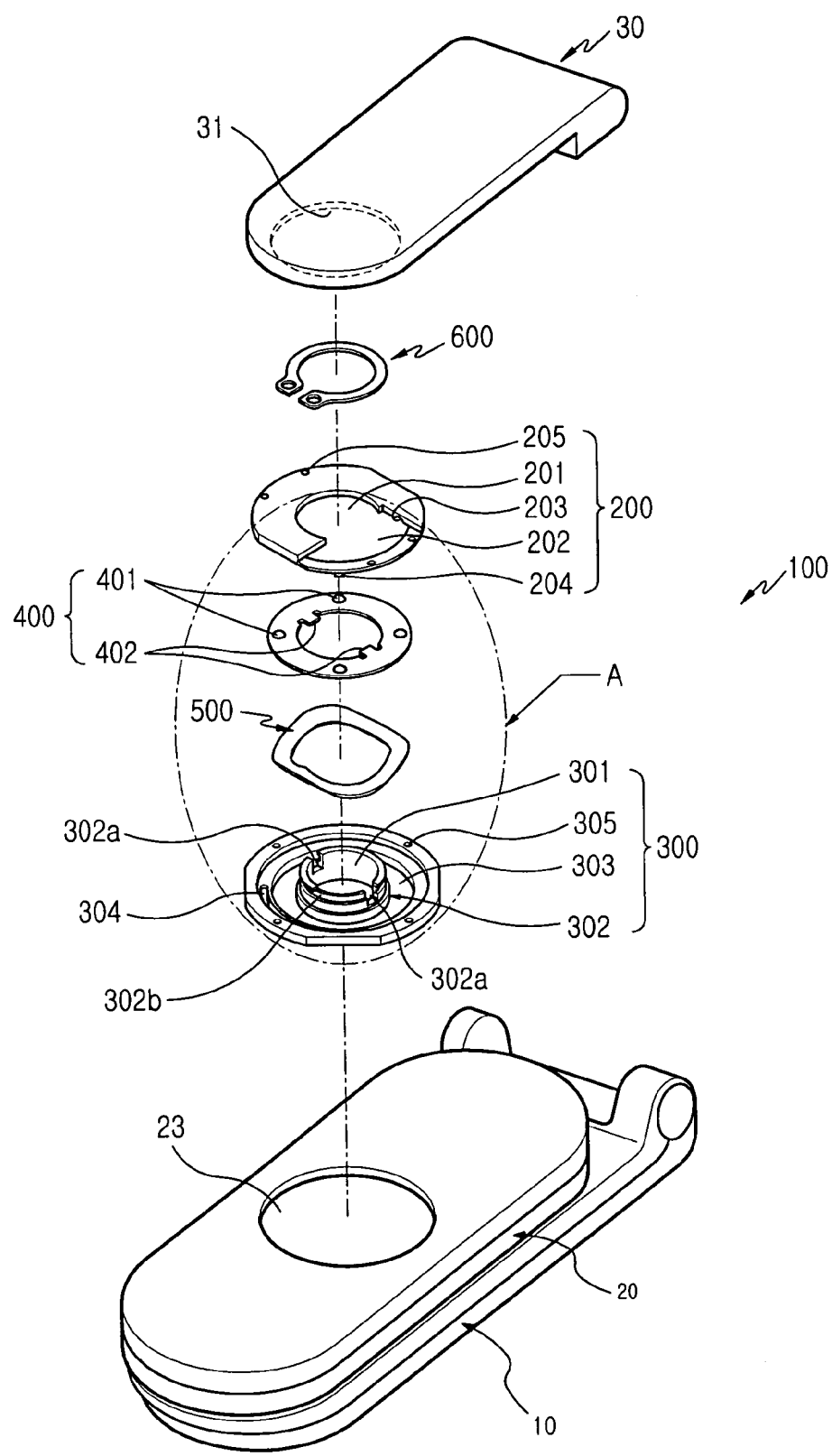
FIG. 4 is an exploded perspective view illustrating a hinge device of a mobile phone having a rotation type display according to one embodiment of the present invention.

As shown in FIG. 4, the mobile phone having a rotation type display includes the body housing 10, the folder 20 having the display unit and the connection member.

Figure 5:
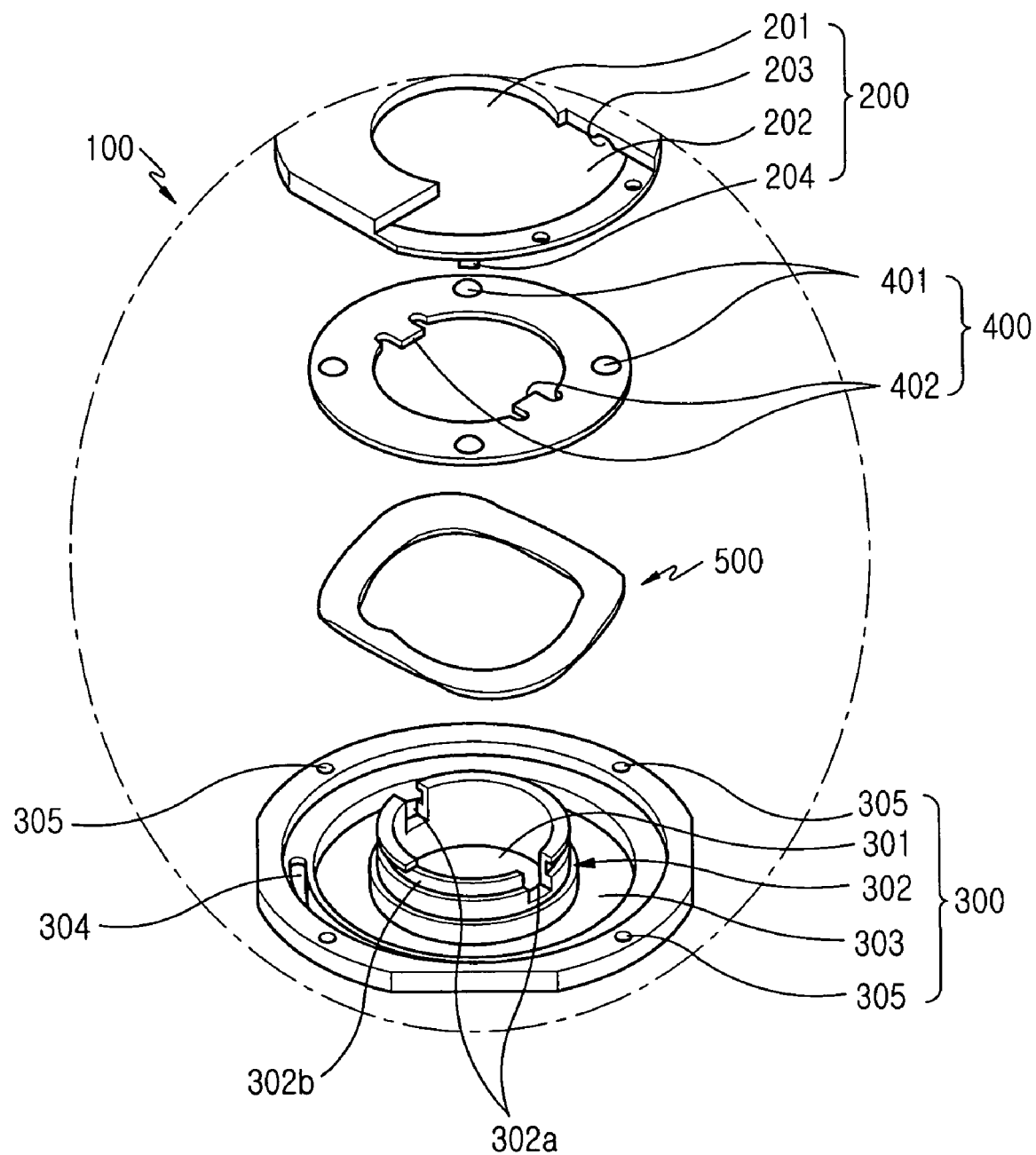
FIG. 5 is an enlarged view of area "A" shown in FIG. 4.

As shown in FIGS. 4 and 5, the hinge device of the mobile phone having a rotation type display includes the plate-shape hinge module 100 accommodated in the folder 20 and the connection member 30. The first hinge plate 200 of the hinge module 100 is accommodated in the first coupling recess 31 of the connection member 30 and is screw-coupled thereto.

Figure 6:
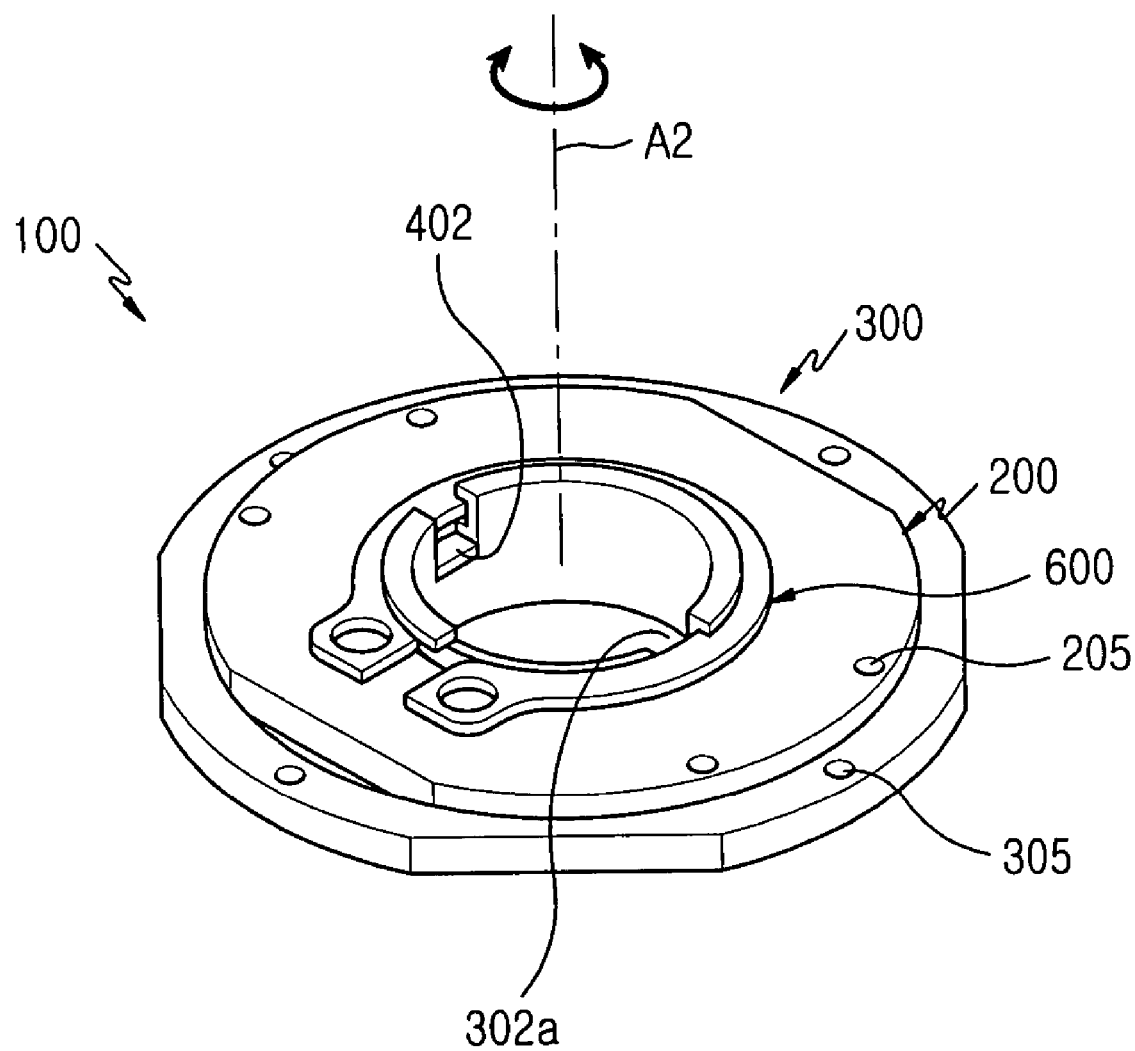
FIG. 6 is a perspective assembled view of a hinge device of a mobile phone having a rotation type display according to one embodiment of the present invention.

In this state, as shown in FIGS. 4–6, the second hinge plate 300 is accommodated in the second coupling recess 23 of the folder 20 while facing the first hinge plate 200 in such a manner that the folder 20 can rotate about the hinge axis A2 of the hinge module 100.

As mentioned above, the second hinge plate 300 is provided at a center thereof with the hinge housing 302 having a cylindrical shape and protruding along the hinge axis A2. The hinge housing 302 is inserted into the perforated hole 201 formed at a center of the first hinge plate 200.

As mentioned above, the rotary washer 400 is positioned between the first and second hinge plates 200 and 300 and is aligned around the hinge housing 302 so as to allow the second hinge plate 300 to rotate in a predetermined direction. The rotary washer 400 is coupled with the coupling hole 202 formed around the perforated hole 201 of the first hinge plate 200.

Figure 11:
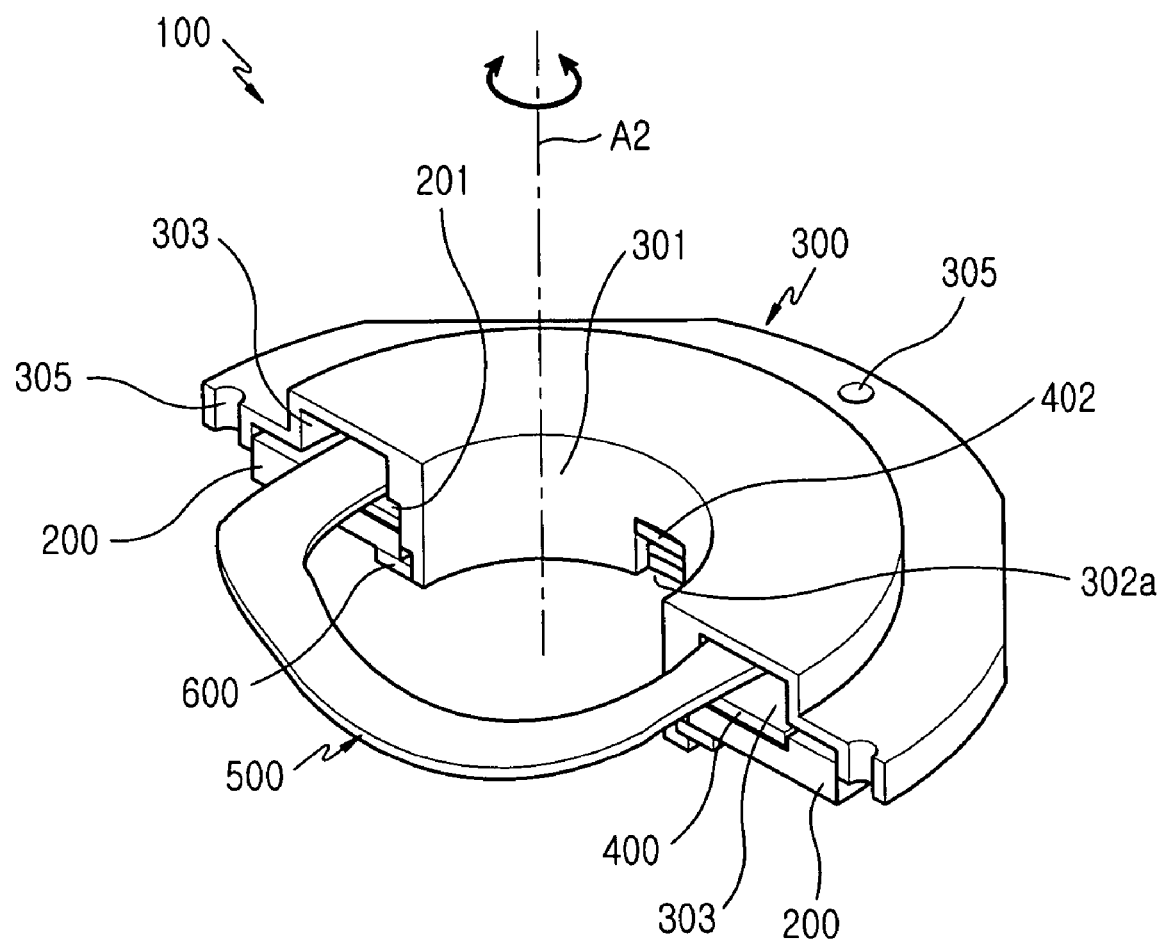
FIG. 11 is a perspective view illustrating a coupling state of a wave washer of a hinge device provided in a mobile phone having a rotation type display according to one embodiment of the present invention.

As shown in FIG. 5, the wave washer 500 is positioned between the second hinge plate 300 and the rotary washer 400 and is aligned around the hinge housing 302 so as to apply bias force to the folder 20. As shown in FIG. 11, the wave washer 500 includes a leaf spring having a ring-like shape, a circumference of which is irregularly formed. In addition, the wave washer 500 is accommodated in the receiving groove 303 formed around the hinge housing 302. In this state, as shown in FIG. 6, the snap ring 600 is coupled into the coupling slot 302b formed at one end of the hinge housing 302 after the rotary washer 400 and the wave washer 500 have been sequentially coupled with the perforated holes 201 and 301, respectively.

Figure 7:
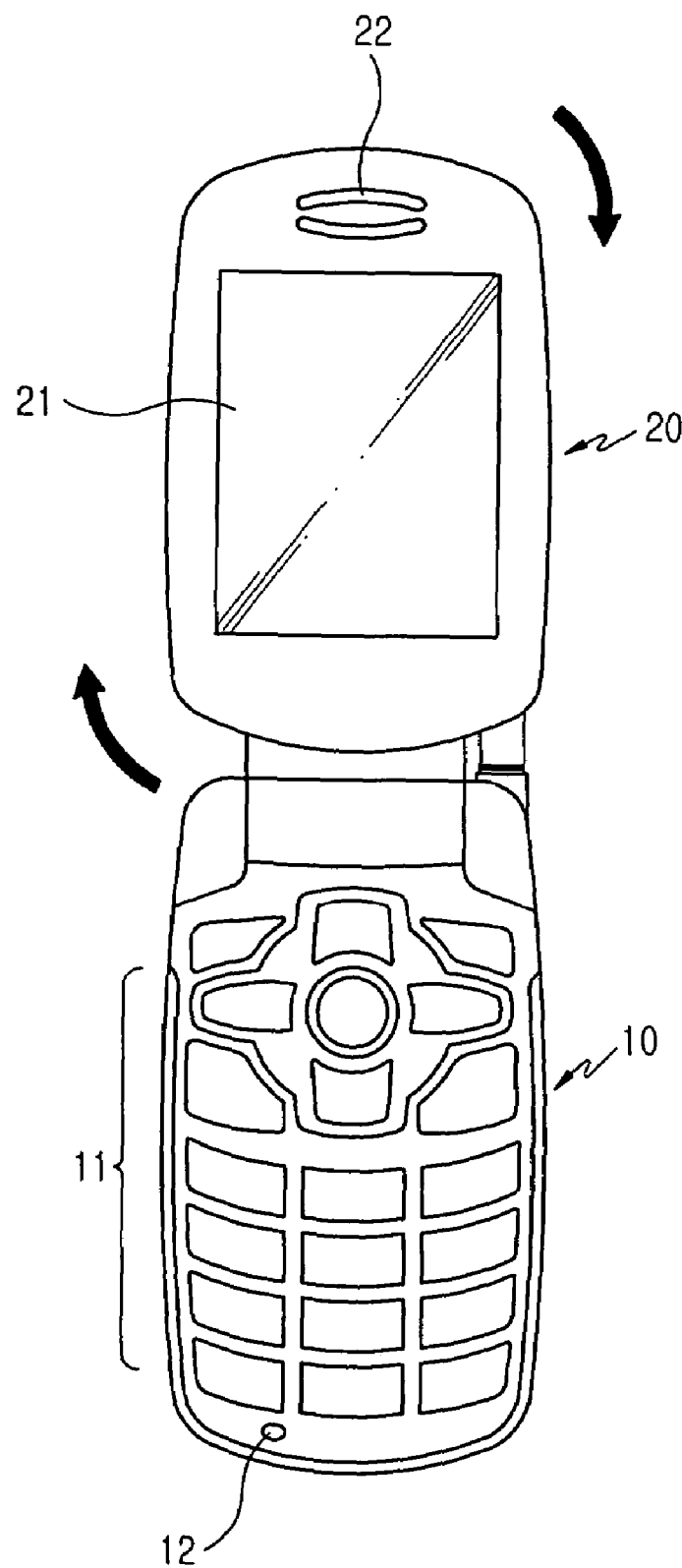
FIG. 7 is a plan view of a mobile phone having a rotation type display according to one embodiment of the present invention when a folder is not rotated.
Figure 8:
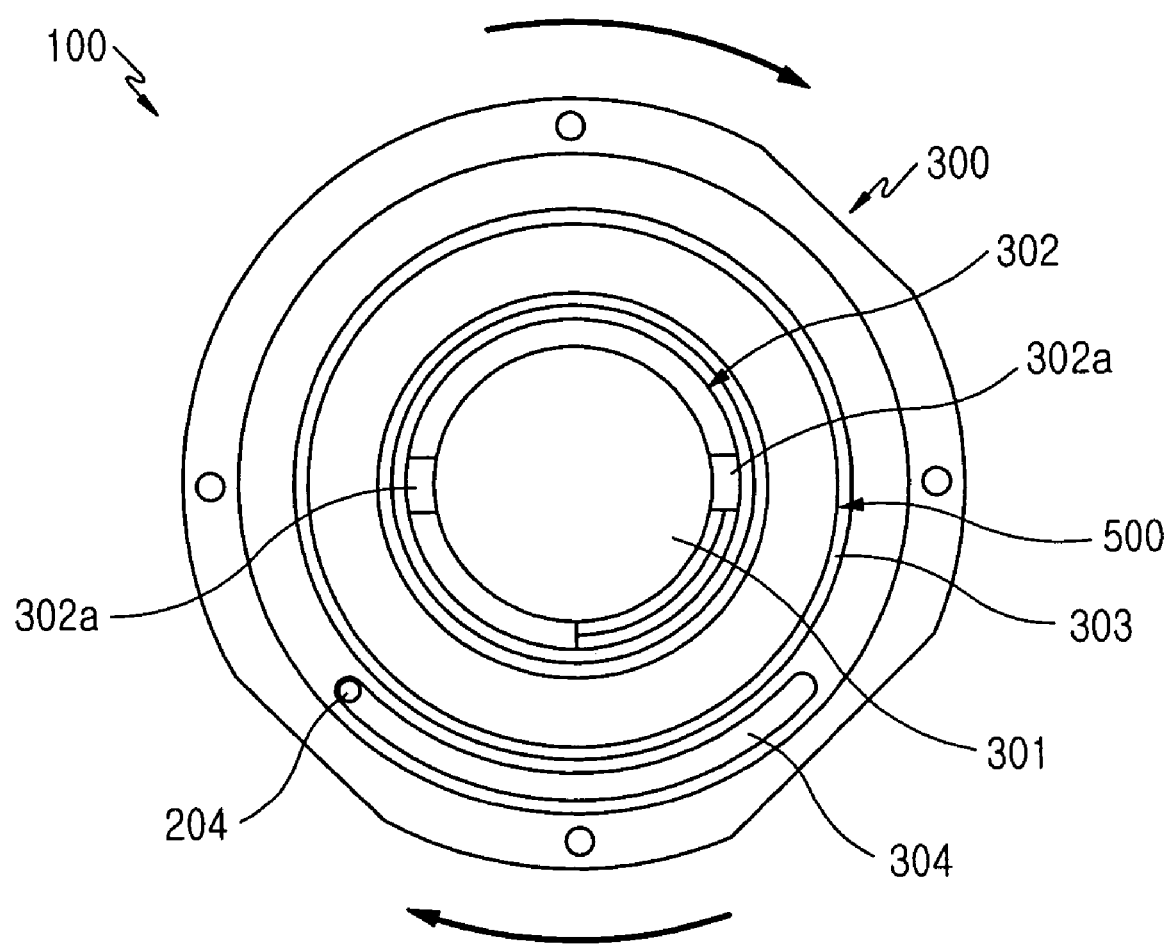
FIG. 8 is a plan view of a hinge device shown in FIG. 7.

As shown in FIGS. 7 and 8, since at least one washer protrusion 401 is formed along the outer circumferential portion of the rotary washer 400 with a uniform interval in such a manner that the washer protrusions 401 face the washer grooves 203 of the first hinge plate 200, the washer protrusions 401 are inserted into the washer grooves 203.

Figure 9:
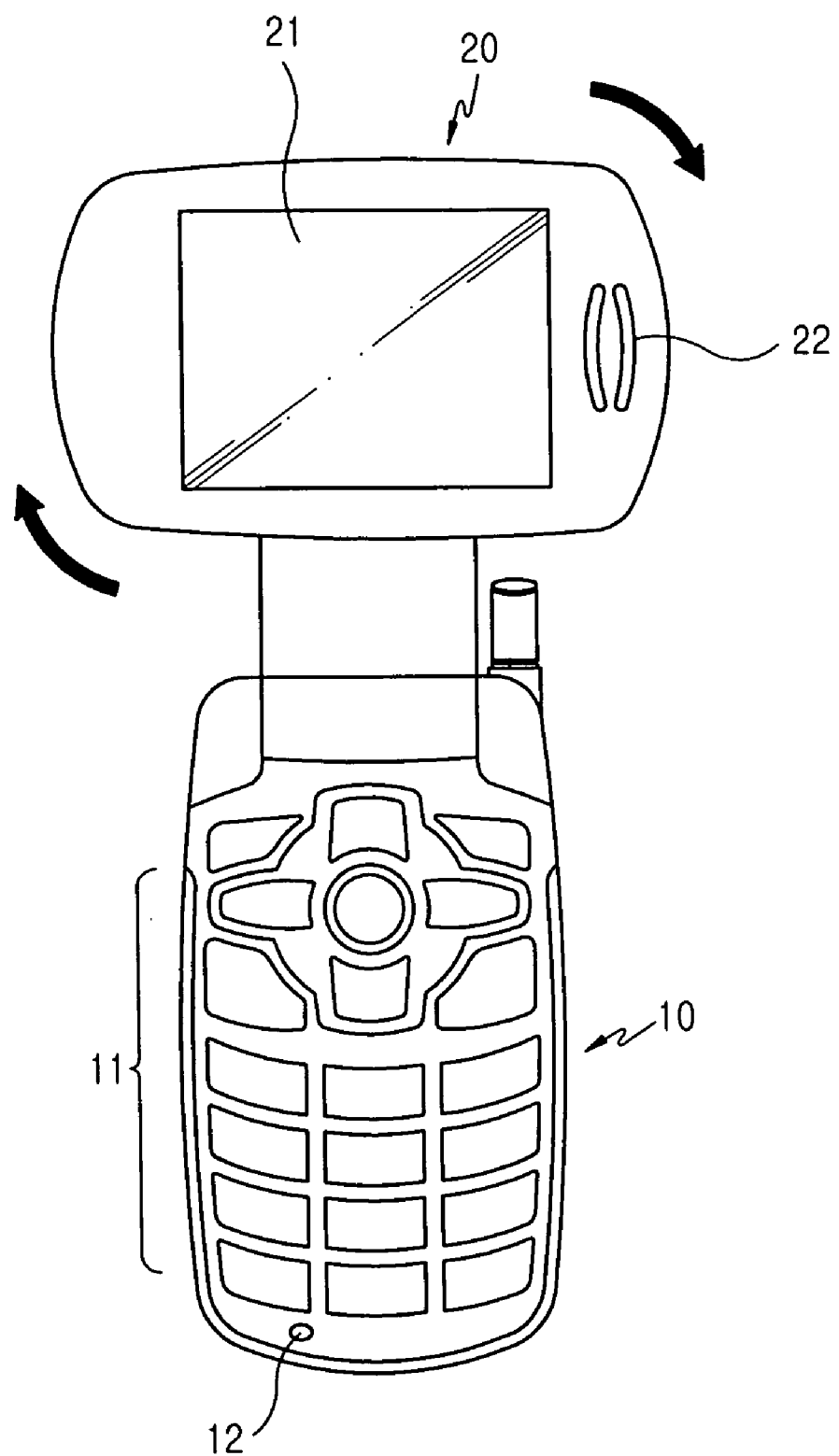
FIG. 9 is a mobile phone having a rotation type display according to one embodiment of the present invention when a folder has been rotated at a right angle.
Figure 10:
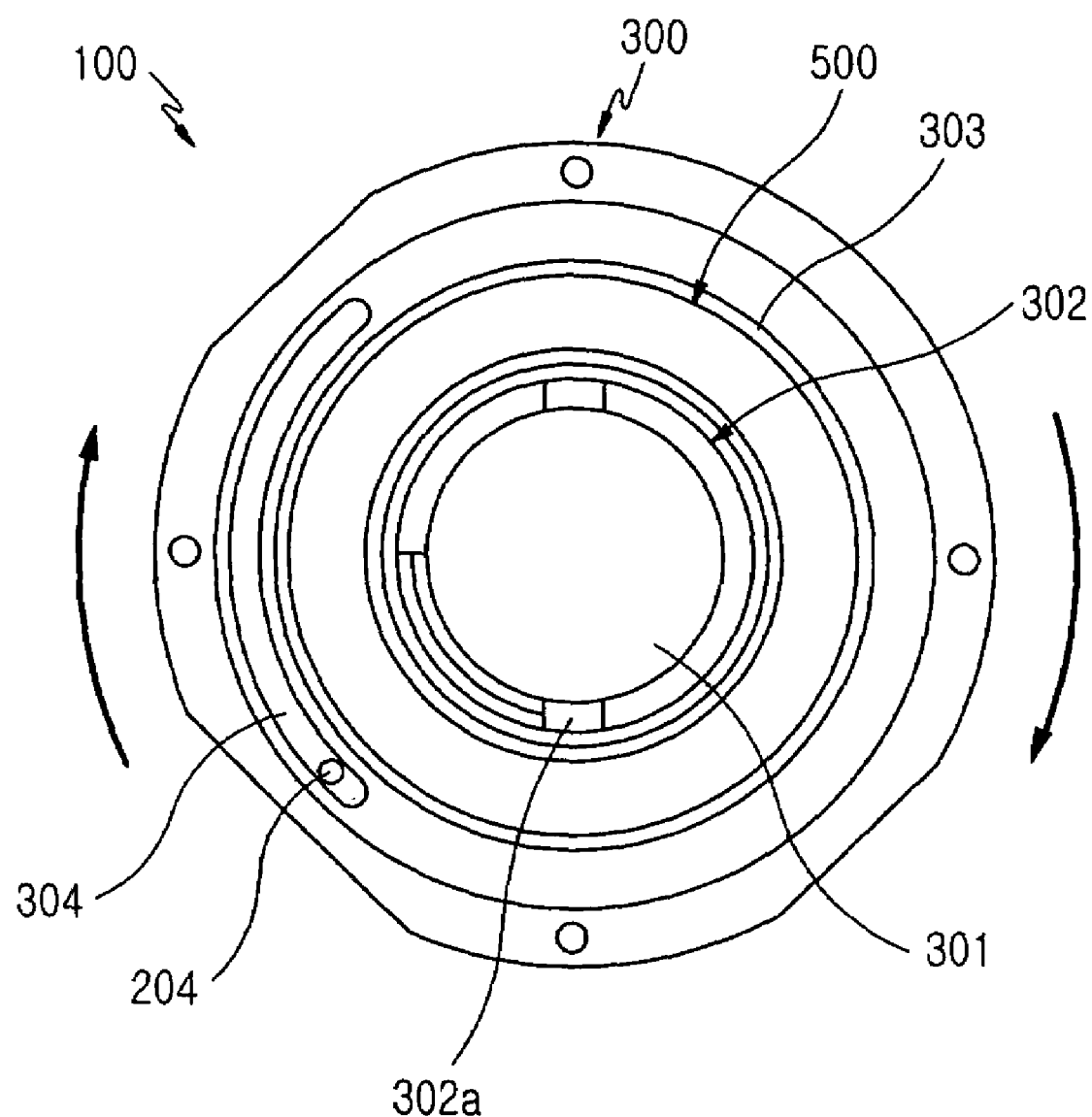
FIG. 10 is a plan view of a hinge device shown in FIG. 9.

In this state, as shown in FIGS. 9 and 10, if the folder 20 rotates at a right angle about the hinge axis A2 relative to the connection member, the second hinge plate 300 may rotate together with the folder 20, so that the rotary washer 400 also rotates. At this time, the washer protrusion 401 is separated from the washer groove 203 and is inserted into one of other washer grooves.

Figure 12:
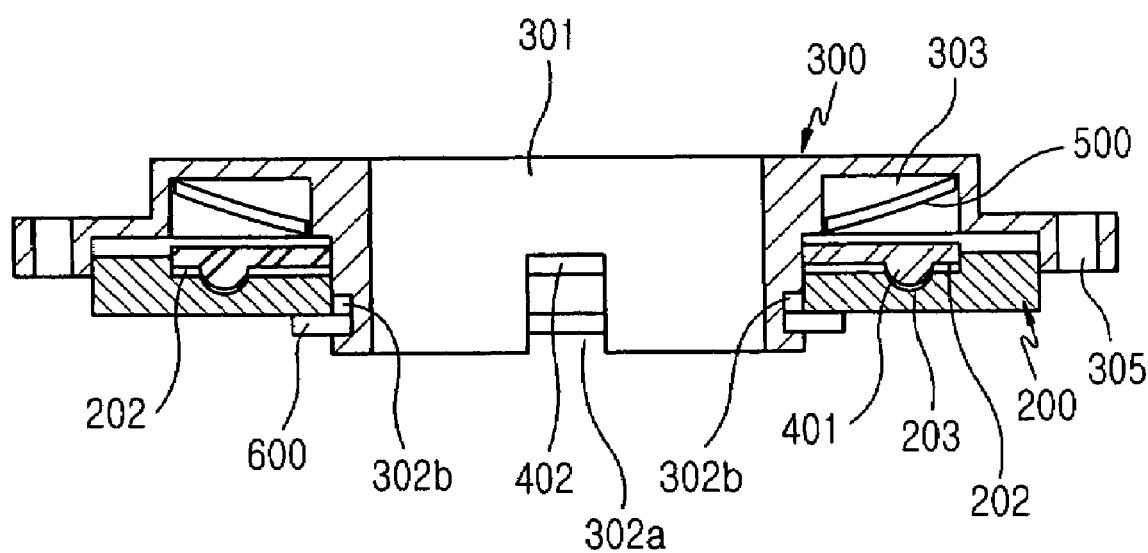
FIG. 12 a side view illustrating a coupling state of a hinge device of a mobile phone having a rotation type display according to one embodiment of the present invention.

As show in FIGS. 11 and 12, the wave washer 500 applies bias force to the washer protrusion 401 of the rotary washer 400 such that the washer protrusion 401 can be stably rested in the washer groove 203. That is, the wave washer 500 applies the bias force in order to rotate the washer protrusion 401 and to allow the washer protrusion 401 to be engaged with or separated from the washer groove 203.

Figure 13:
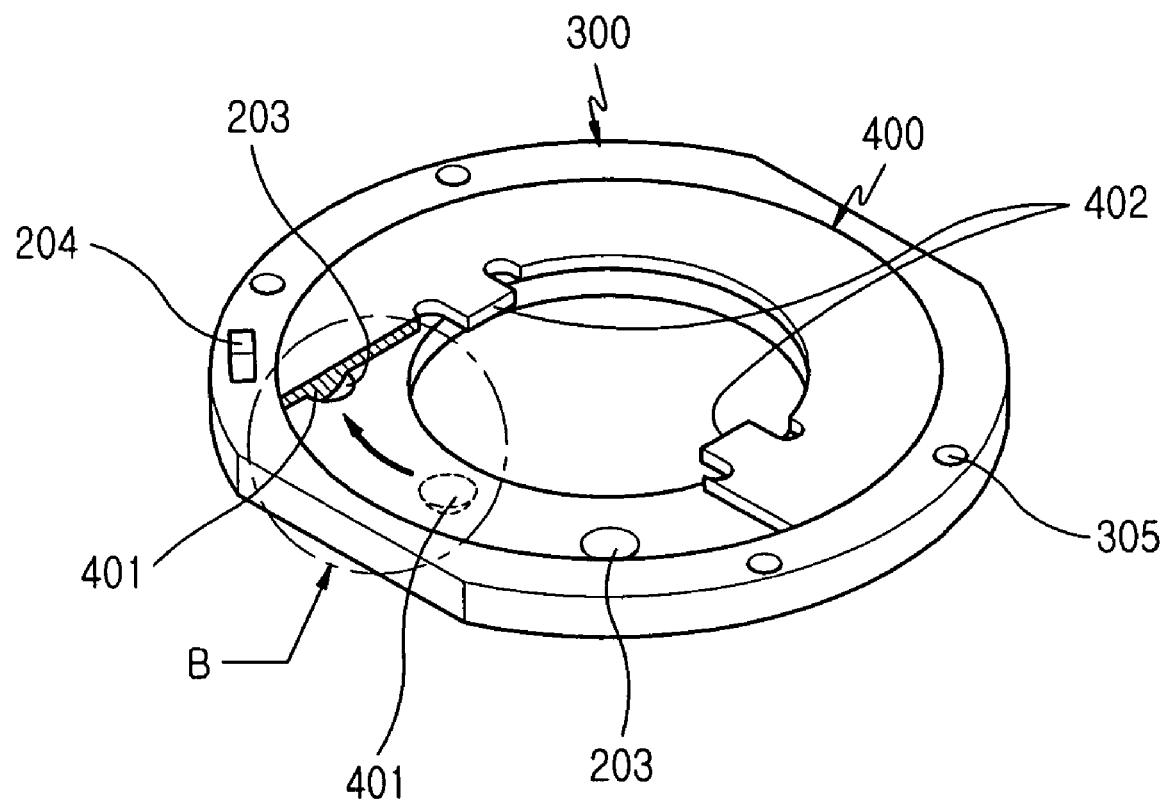
FIG. 13 is a perspective view illustrating an operational state of a second hinge plate and a rotary washer of a hinge device provided in a mobile phone having a rotation type display according to one embodiment of the present invention.

As shown in FIGS. 12 and 13, since the fixing protrusions 402 are formed at an inner portion of the rotary washer 400 and are fixedly inserted into the fixing slots 302a of the hinge housing 302, the rotary washer 400 may rotate together with the second hinge plate 300.

Figure 14:
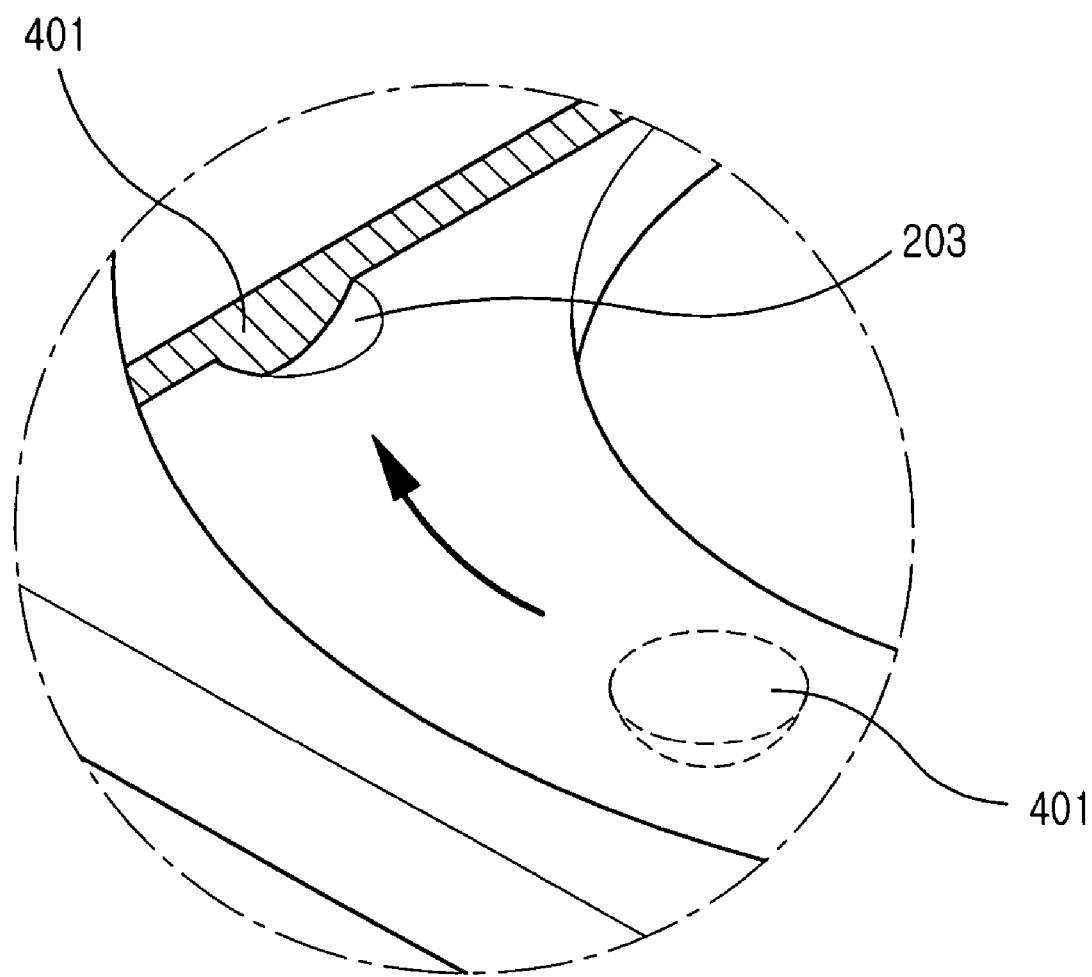
FIG. 14 is an enlarged view of area "B" shown in FIG. 13.

In addition, as shown in FIGS. 13 and 14, the washer groove 203 is a hemispherical groove and the washer protrusion 401 is a hemispherical protrusion.

As shown in FIGS. 8 and 10, the guide slot 304 is formed at an outer portion of the receiving groove 303 of the second hinge plate 300 and is coupled with the stopper protrusion 204 of the first hinge plate 200 so as to guide the stopper protrusion 204 and to limit the rotation of the folder 20 when the folder 20 rotates at a right angle.

That is, the guide slot 304 is formed along the circumference of the receiving groove 303 with a predetermined length such that the folder 20 can rotate at a right angle relative to the connection member 30.

As shown in FIG. 9, if the folder 20 rotates at a right angle and the folder 20 is aligned perpendicular to the rotation member 30.

As mentioned above, the present invention provides a hinge module for a mobile phone having a rotation type display in order to rotate a folder having a display unit, so that convenience of use for the mobile phone having a rotation type display can be improved and the size and a thickness of the mobile phone having a rotation type display can be reduced while also limiting incidents of breakages of the hinge module.

While the invention has been shown and described with reference to certain preferred embodiments thereof, it will be understood by those skilled in the art that various changes in form and details may be made therein without departing from the spirit and scope of the invention as defined by the appended claims. For instance, the present invention is applicable to various kinds of portable terminals.

What is claimed is:

1. A hinge device for a mobile phone having a rotation type display including a body housing, a folder having a display unit, and a connection member for rotatably connecting the folder to the body housing such that the folder is movable into an open position and a closed position with respect to the body housing, the hinge device comprising:

a hinge module having a plate shape, the hinge module being accommodated in the folder and rotatably coupled to the connection member while facing the connection member so as to rotate the folder relative to the connection member about a hinge axis thereof, the hinge module including a first hinge plate screw-coupled to the connection member;

a second hinge plate accommodated in the folder and coupled to the first hinge plate allowing rotation of the folder about the hinge axis;

a rotary washer aligned between the first and second hinge plates while facing the first hinge plate allowing rotation of the second hinge, said rotary washer including at least one washer protrusion formed along an outer circumferential portion of the rotary washer with a uniform interval in such a manner that the washer protrusion is inserted into a washer groove of the first hinge plate and a pair of fixing protrusions formed at an inner portion of the rotary washer and fixedly inserted into fixing slots of a hinge housing of the second hinge plate;

a wave washer provided between the second hinge plate and the rotary washer applying a biasing force to the folder in order to rotate the folder;

and a snap ring coupled to the second hinge plate.

2. The hinge device as claimed in claim 1, wherein the connection member is formed with a first coupling recess for receiving the first hinge plate therein, and the folder is formed with a second coupling recess for receiving the second hinge plate therein.

3. The hinge device as claimed in claim 1, wherein the first hinge plate includes:
- a perforated hole formed at a center of the first hinge plate;
- a coupling hole formed at an outer peripheral portion of the perforated hole so as to be coupled with the rotary washer;
- at least one washer groove formed in a circumferential direction of the coupling hole with a uniform interval;
- a stopper protrusion provided at a predetermined outer portion of the washer groove and inserted into a guide slot formed in the second hinge plate; and
- a plurality of screw holes for allowing the first hinge plate to be screw-coupled with the connection member.

4. The hinge device as claimed in claim 3, wherein the washer groove includes a hemispherical groove.

5. The hinge device as claimed in claim 1, wherein the second hinge plate includes:
- a perforated hole positioned at a center of the second hinge plate;
- a hinge housing having a cylindrical shape and protruding from an outer peripheral portion of the perforated hole along the hinge axis;
- a receiving groove formed around the hinge housing for receiving the wave washer therein;
- a guide slot formed at an outer portion the receiving groove and coupled with a stopper protrusion of the first hinge plate so as to guide the stopper protrusion and to limit a rotation of the folder when the folder rotates and a plurality of screw holes for allowing the second hinge plate to be screw-coupled with the fold.

6. The hinge device as claimed in claim 5, wherein the guide slot is formed along a circumference of the receiving groove with a predetermined length in order to allow the folder to rotate at a right angle relative to the connection member.

7. The hinge device as claimed in claim 5, wherein the hinge housing is formed with a pair of fixing slots, and fixing protrusions of the rotary washer, are fixedly inserted into the fixing slots the hinge housing allowing the rotary washer to rotate with the second hinge plate.

8. The hinge device as claimed in claim 7, wherein the fixing slots are symmetrically aligned with the fixing protrusions while facing each other.

9. The hinge device as claimed in claim 5, wherein the hinge housing is formed at one end thereof with a coupling slot to which the snap ring is coupled.

10. The hinge device as claimed in claim 1, wherein the washer protrusion includes a hemispherical protrusion.

11. The hinge device as claimed in claim 1, wherein the fixing slots are symmetrically aligned with the fixing protrusions about the hinge housing.

12. The hinge device as claimed in claim 1, wherein the wave washer includes a leaf spring having a ring-like shape, a circumference of which is irregularly formed.

* * * * *